Aug. 12, 1941.  U. EICHLER  2,252,621
CALCULATING MACHINE
Filed June 11, 1938  11 Sheets-Sheet 1

INVENTOR
U. Eichler
BY John Chind
ATTORNEY

Aug. 12, 1941.  U. EICHLER  2,252,621
CALCULATING MACHINE
Filed June 11, 1938  11 Sheets-Sheet 2

INVENTOR
U. Eichler
BY John C Lind
ATTORNEY

Aug. 12, 1941.   U. EICHLER   2,252,621
CALCULATING MACHINE
Filed June 11, 1938   11 Sheets-Sheet 3
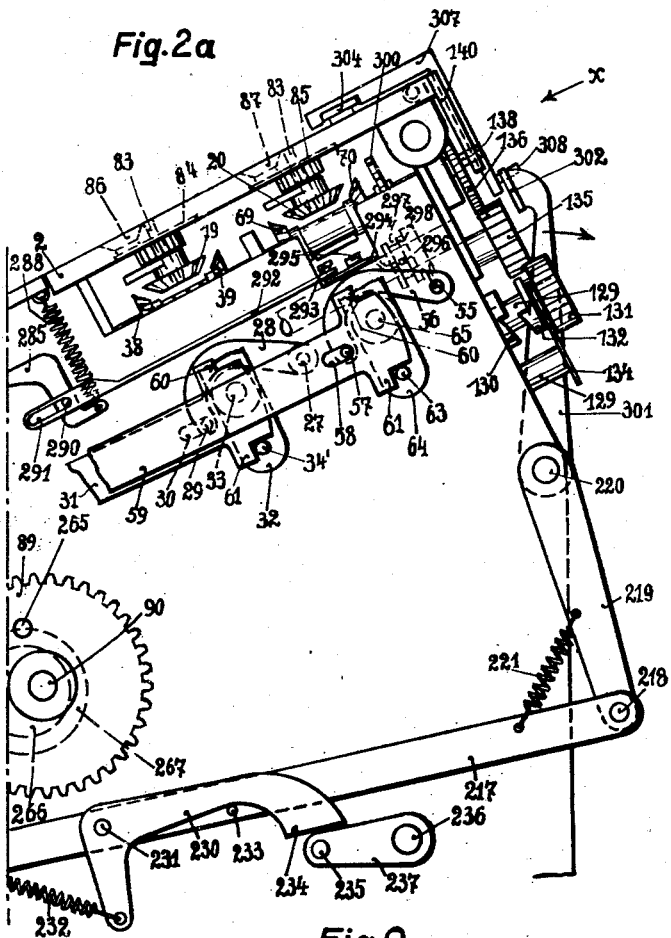
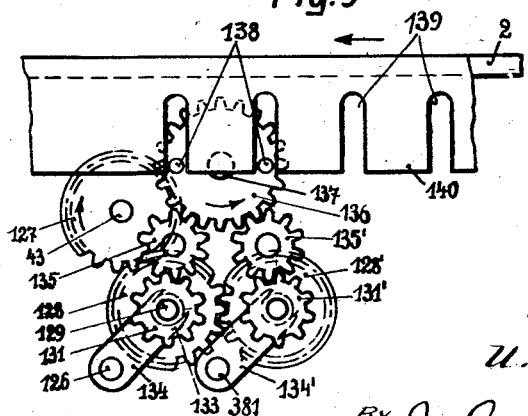
INVENTOR
U. Eichler
BY John Chind
ATTORNEY Aug. 12, 1941.  U. EICHLER  2,252,621
CALCULATING MACHINE
Filed June 11, 1938   11 Sheets-Sheet 4
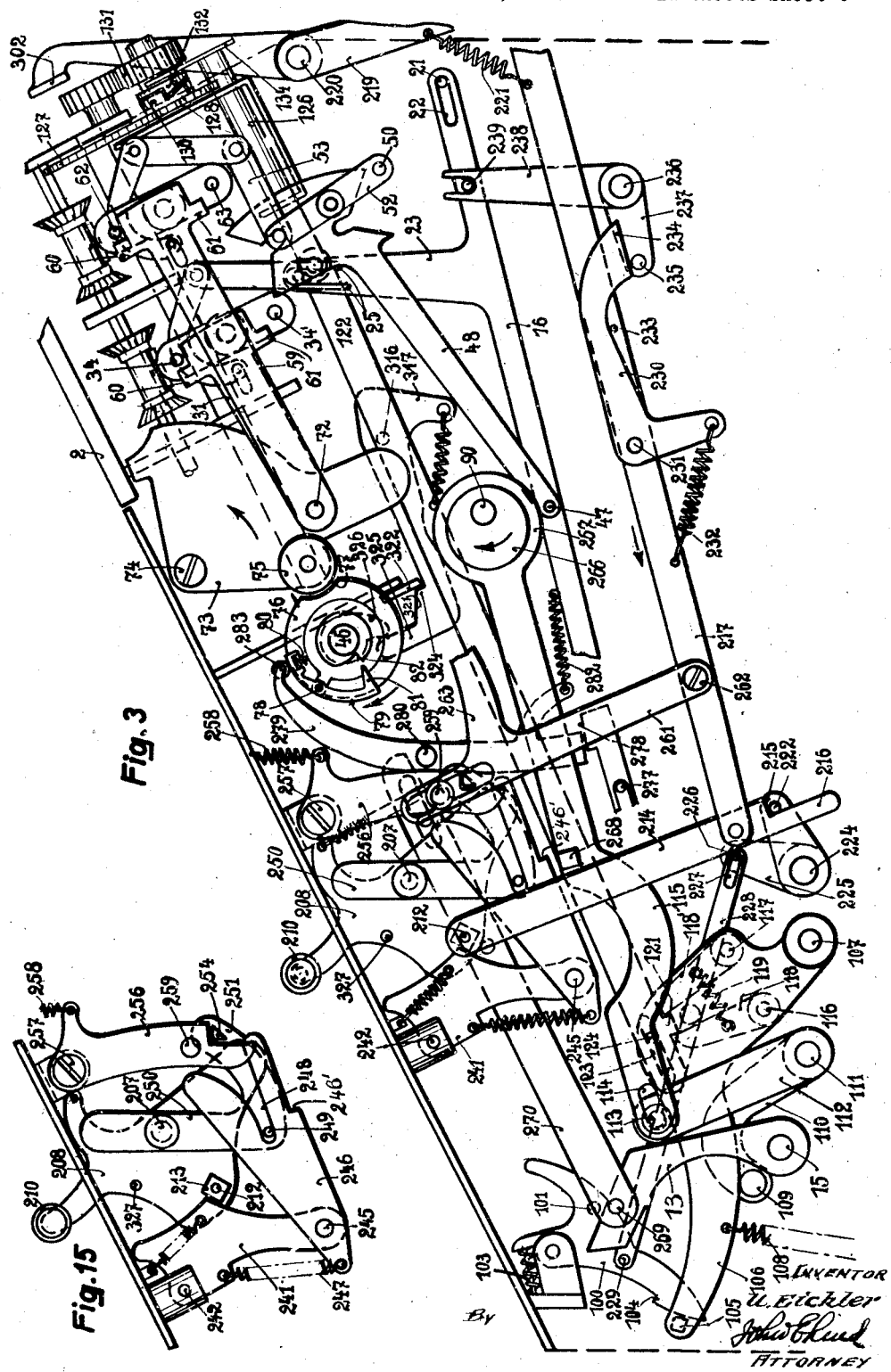

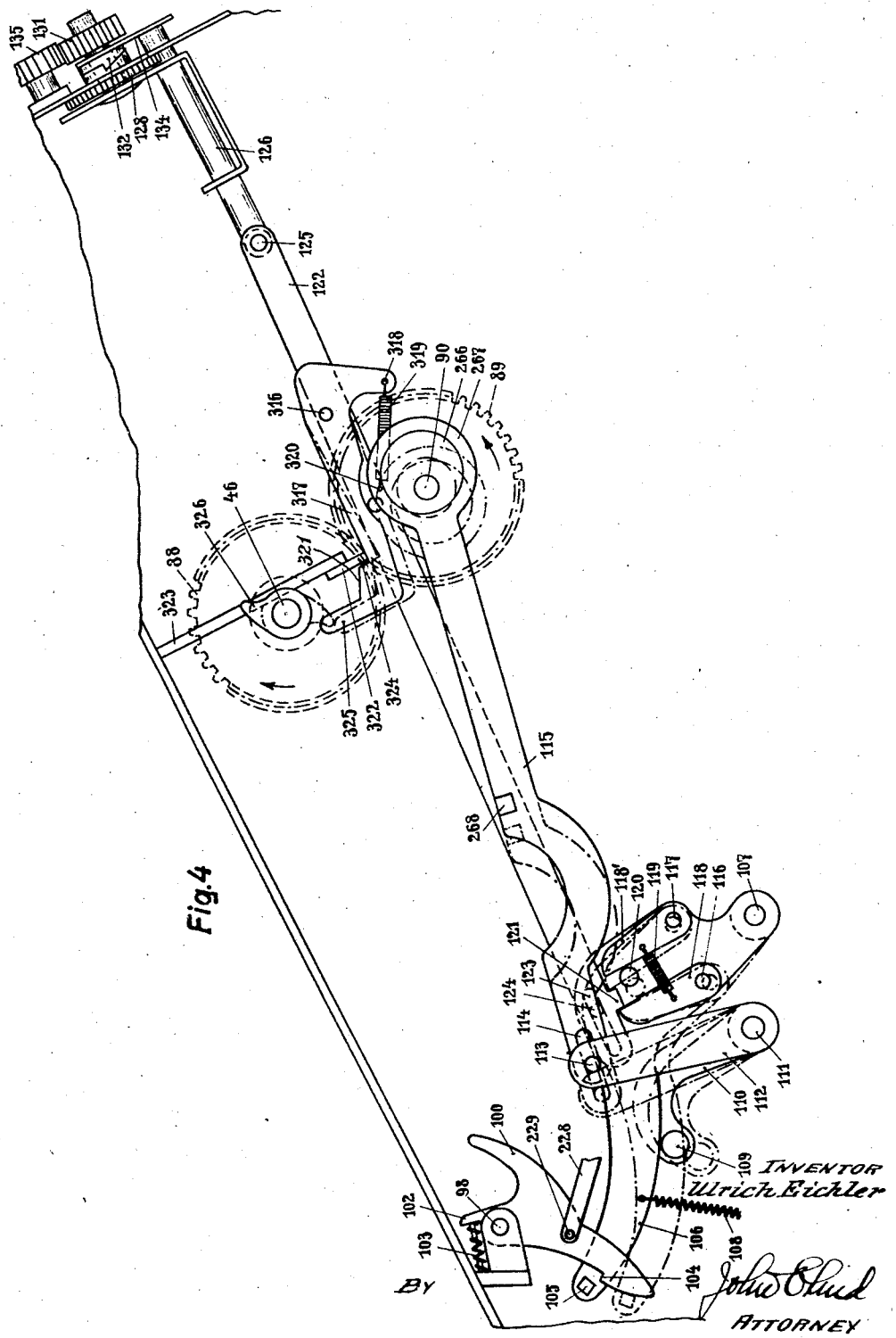

Aug. 12, 1941.    U. EICHLER    2,252,621
CALCULATING MACHINE
Filed June 11, 1938    11 Sheets-Sheet 6

INVENTOR
U. Eichler
By John Child
ATTORNEY

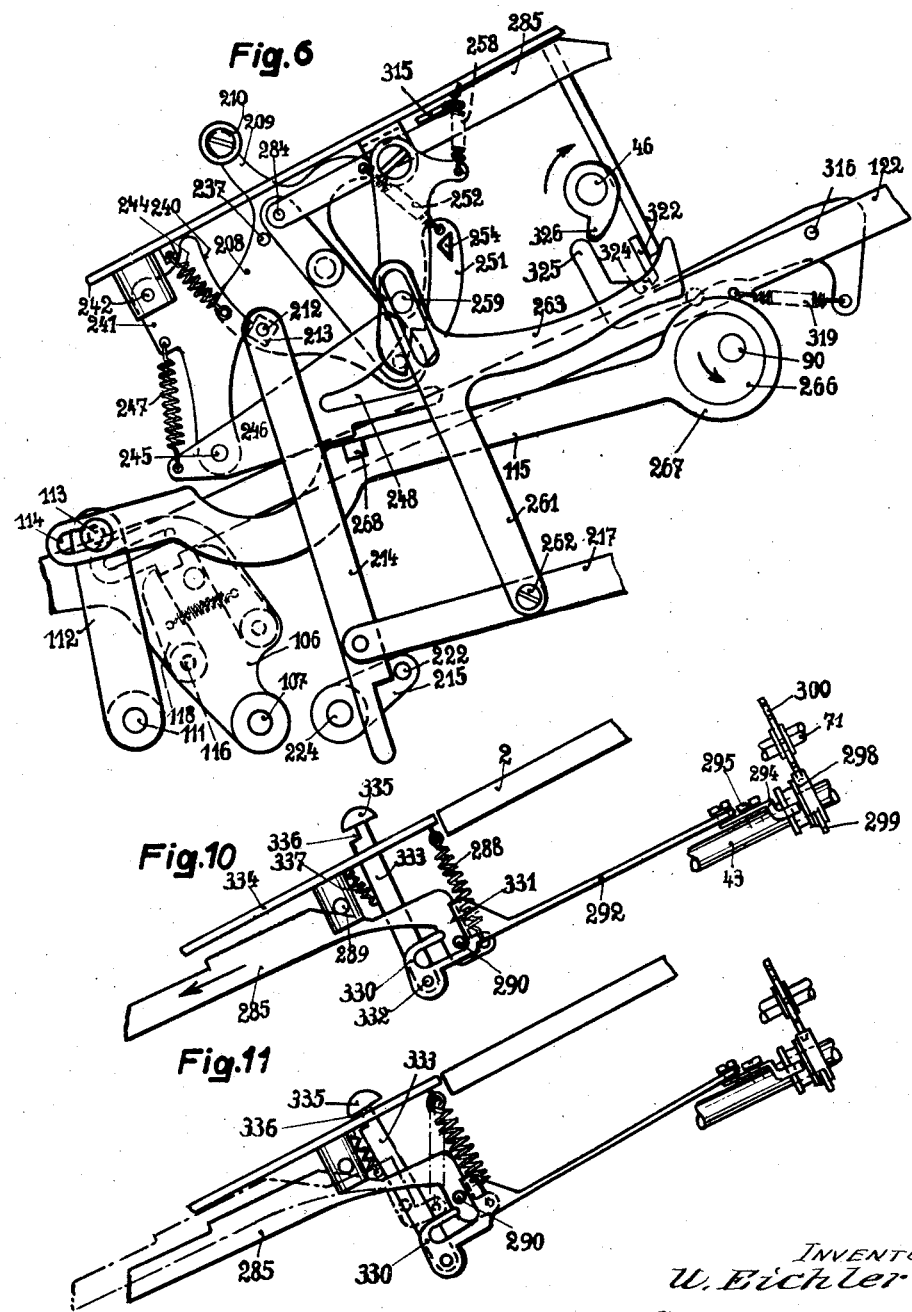

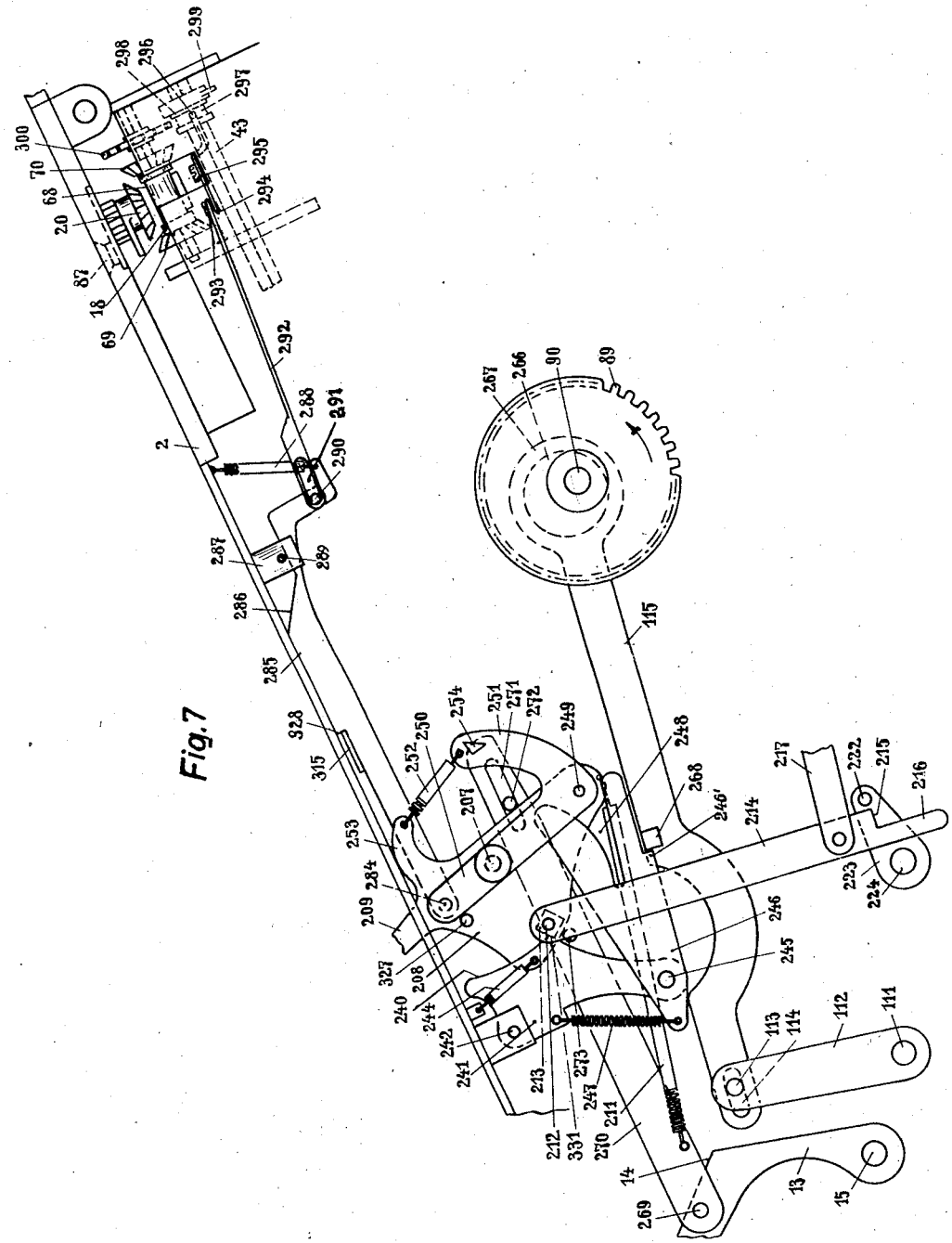

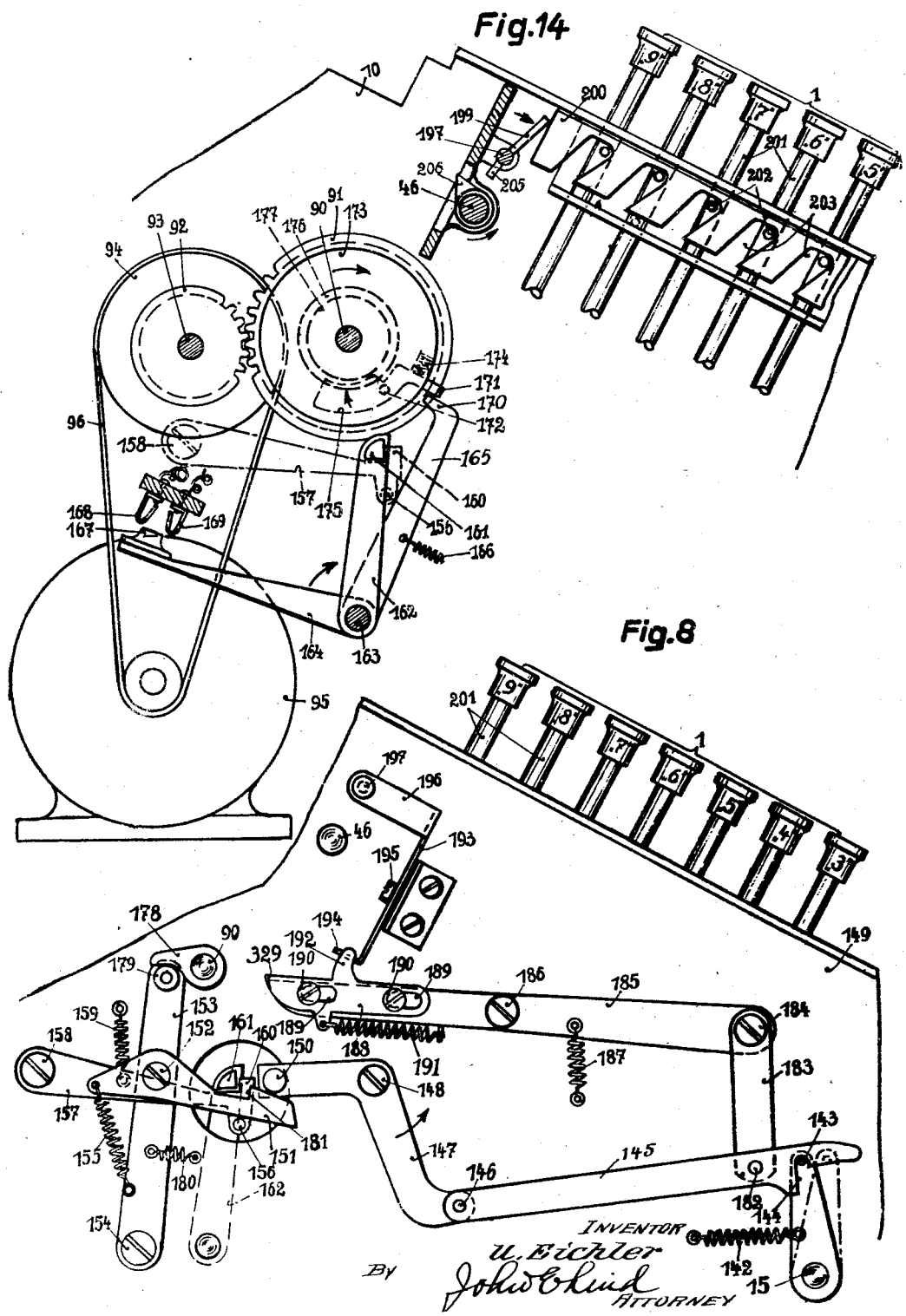
Aug. 12, 1941.                U. EICHLER                2,252,621
                          CALCULATING MACHINE
              Filed June 11, 1938          11 Sheets-Sheet 9

Aug. 12, 1941.  U. EICHLER  2,252,621
CALCULATING MACHINE
Filed June 11, 1938  11 Sheets-Sheet 10

INVENTOR
U. Eichler
By John C. Reid
ATTORNEY

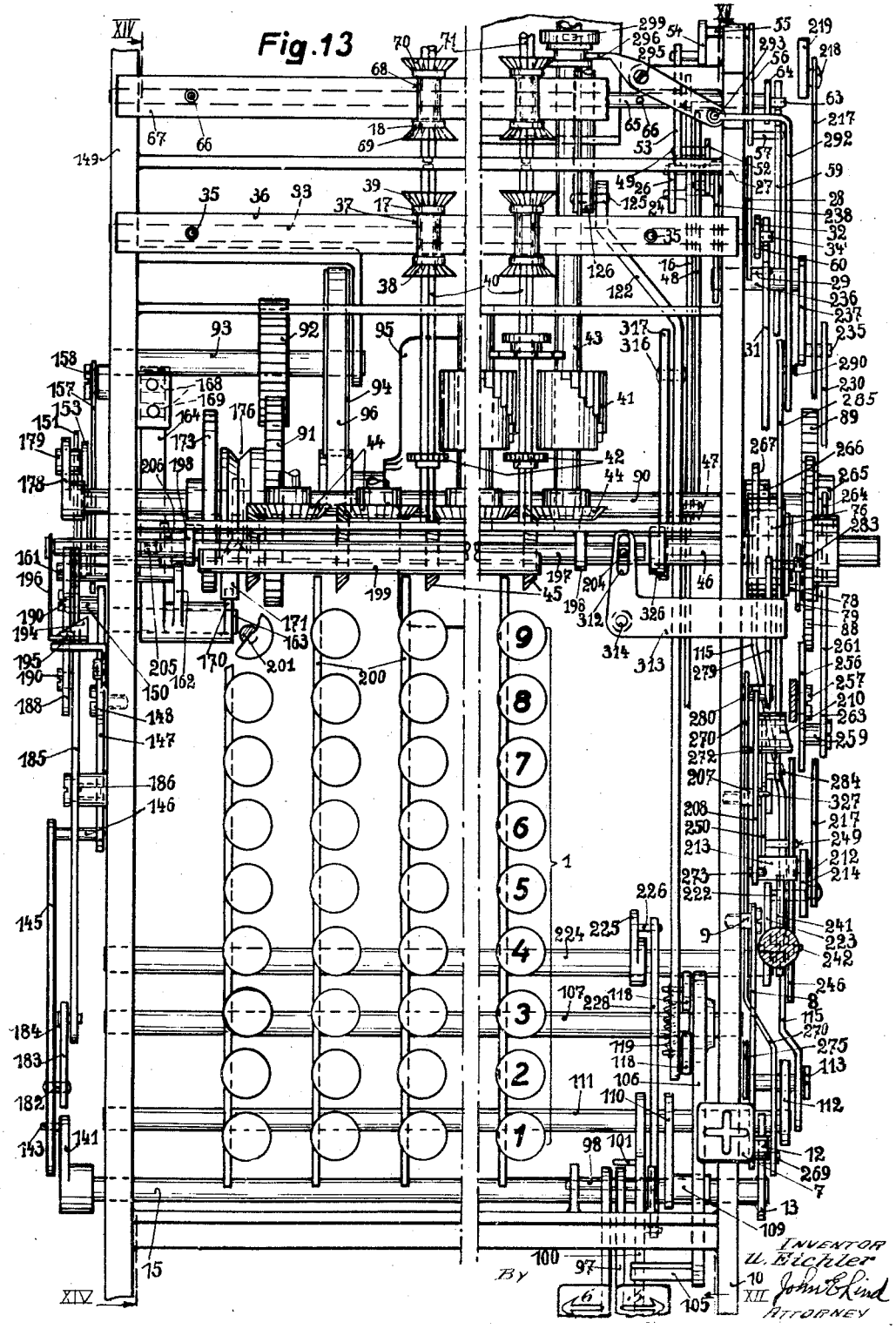

Patented Aug. 12, 1941

2,252,621

UNITED STATES PATENT OFFICE 2,252,621

CALCULATING MACHINE

Ulrich Eichler, Glashutte, Germany

Application June 11, 1938, Serial No. 213,279
In Germany February 19, 1937

4 Claims. (Cl. 235—63)

This invention relates to a calculating machine and is particularly directed to new and improved means for carrying out division calculations.

In division calculation, the carriage of the calculating machine must undergo a certain preliminary adjustment, that is, the divisor set up in the calculating mechanism must be so set up with respect to the dividend set up in the totalizer so that there are some free places behind it, the number of which corresponds to the number of decimal places to which the quotient is to be calculated.

This preliminary set-up of the carriage was done either by hand by directly moving it, or, if the calculating machine was provided with a mechanically shiftable carriage, by means of a key, which would set in actuation the carriage shifting mechanism. Particularly when several division calculations were to be carried out, for which the same preliminary adjustment of the carriage was necessary, this adjustment is a time consuming operation while, if the carriage is adjusted mechanically by actuating a key, close attention is required to verify that it moves to the desired position.

The present invention has for an object to simplify this adjusting operation and utilizes means which, when actuated, sets the carriage shifting drive in operation. A stop, abutment or the like is provided travelling with the carriage which will engage a release member controlling the shifting drive to bring the carriage to a stop after a certain predetermined number of shifts dependent on the preliminary setting of the stop or abutment. It is an object of the invention, therefore, to provide simple, accurate means to bring the carriage into a predetermined desired position.

A further object of the invention is to connect the release member by means of a rod system with the calculating mechanism in order to set such mechanism in operation after the carriage shifting mechanism is brought to a stop, in order to transfer the value set up in the keyboard of the calculating machine as a dividend in the totalizer. It is an object of the invention, therefore, to provide a single instrumentality to transfer the dividend set up in the keyboard to the totalizer after an adjustment of the carriage position has been made.

A further object of the invention is to provide means actuated by the release member to actuate the clearing mechanism to clear the keyboard following the transfer of the dividend to the totalizer. It is thus possible, without requiring any special means for the keyboard to be clear immediately for the reception of the divisor after the dividend has been set up.

A further object of the invention is to provide a construction wherein the stop member actuates a release member by displacing the same and the stop member is permitted to pass such release member after the displacement thereof. This eliminates the necessity of adjusting the stop provided on the carriage when carrying out a series of division calculations having an equal number of decimal places in the quotients in order to carry out division calculations during the running of such series in which the quotients are to have a larger number of decimal places.

A still further object of the invention is to provide additional means associated with the means for actuating the carriage shift drive, which on the transfer of the value set up in the keyboard into the totalizer moves the actuating pawl of the revolutions counter into disengaged position, thus preventing a "1" appearing in the revolutions counter after such transfer, which would cause errors in the total in certain cases.

A further object of the invention is to provide means whereby in certain kinds of calculation, particularly in finding percentages, in order to obtain the "1" in the revolutions counter after the transfer into the totalizer, the actuating pawl of the revolutions counter is provided with a coupling member to prevent the disengagement of such pawl. The coupling member is suitably provided with a hand lever for selectively avoiding or obtaining the "1" in the revolutions counter.

The invention is, for illustrative purposes only, shown as applied to a "Thomas" type calculating machine.

With these and other objects in view which will become apparent from the detailed description below the invention is shown for illustrative purposes in the drawings in which Fig. 1 is a plan view.

Fig. 2a is a continuation of the view shown in Fig. 2 to the right.

Fig. 3 is a side elevational view with the casing and the wall 10 removed with the parts in a different position from that shown in Figs. 2 and 2a.

Fig. 4 is a side elevational view of certain details illustrating the control of the carriage shifting mechanism.

3 with certain elements omitted for greater clarity illustrating another position of the parts.

Fig. 6 is a partial side elevational view illustrating the cooperation of various elements.

Fig. 7 is a side elevational view of certain details illustrating particularly the mechanism controlling the revolutions counter.

Fig. 8 is a partial side elevational view taken from the left of Fig. 13.

Fig. 9 is a partial rear view taken in the direction of the arrow X in Fig. 2a and illustrating the gearing for shifting the carriage to either the right or the left.

Fig. 10 is a partial side elevational view of a modified construction for controlling the revolutions counter.

Fig. 11 is a similar view to Fig. 10 showing the parts in a different position.

Figure 12:
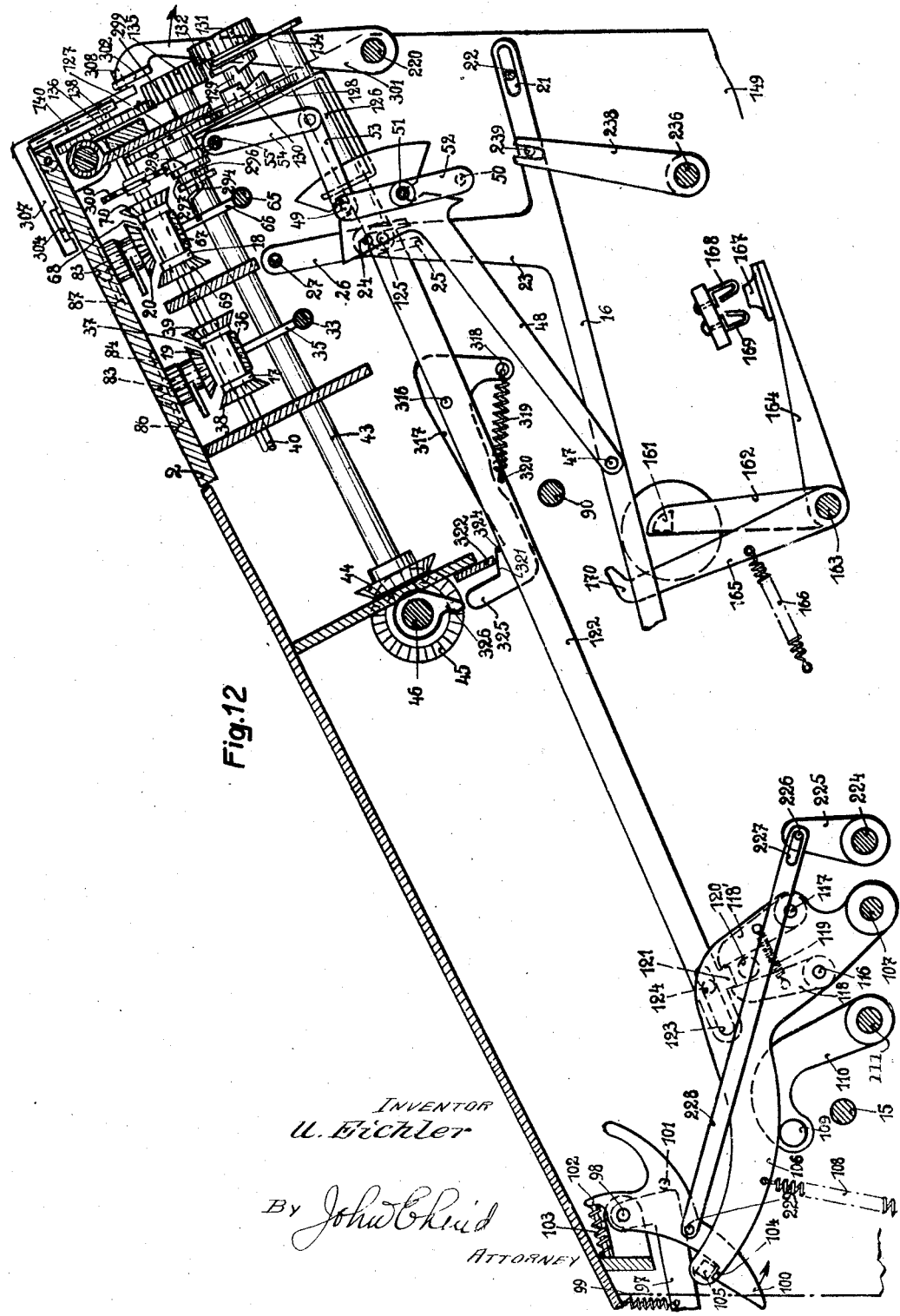

Fig. 12 is a cross sectional view taken on section line XII—XII of Fig. 13 with parts omitted for greater clarity.

Figure 1:
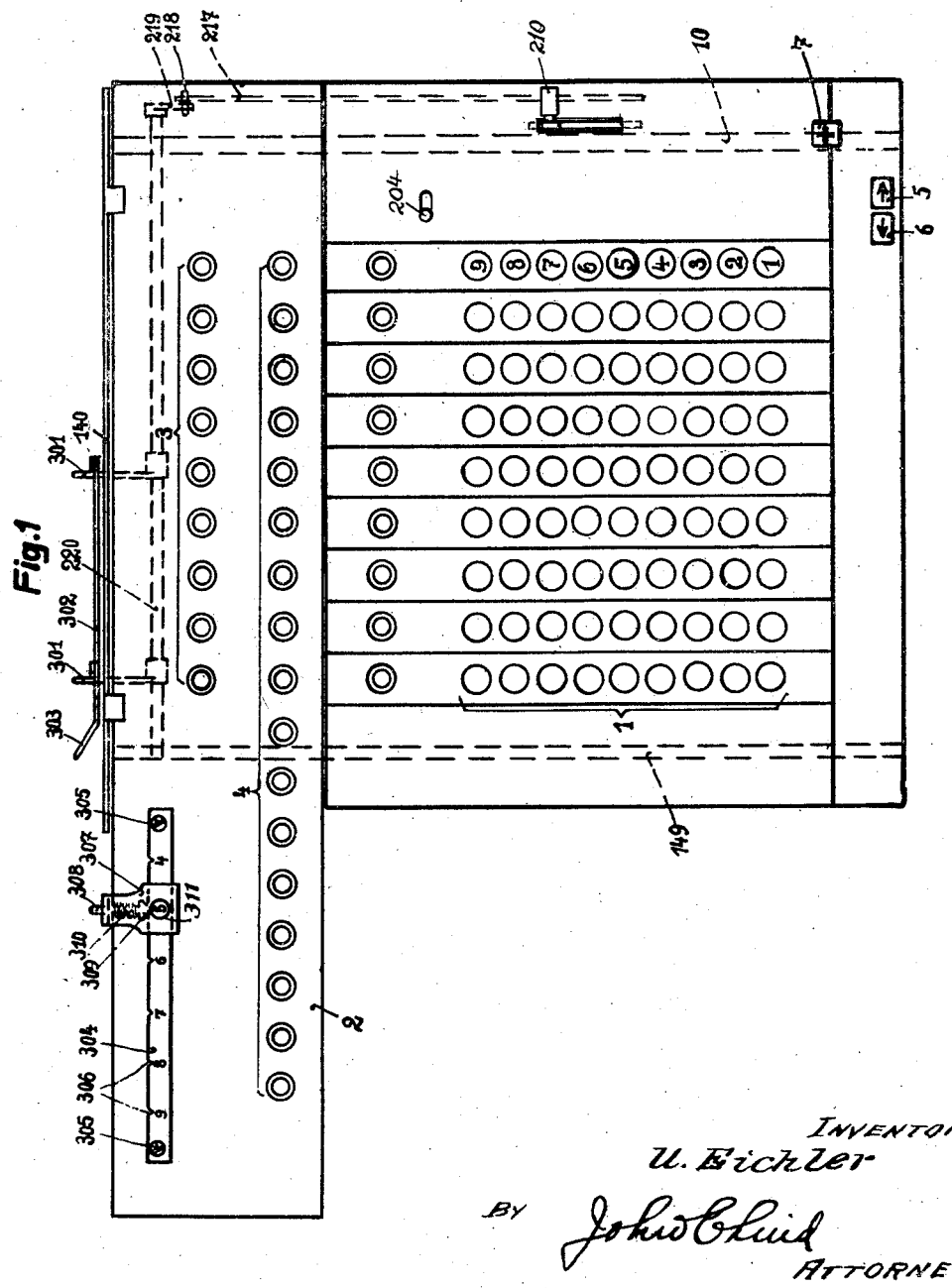

Fig. 13 is a broken plan view on a larger scale than Fig. 1 with the cover plate and carriage removed.

Fig. 14 is a partial cross sectional view taken on section line XIV—XIV of Fig. 13 with parts omitted for clearness, and Fig. 15 is a view of certain elements of Fig. 3 showing their cooperation more clearly.

The keyboard is shown at 1. The carriage 2, arranged on the machine frame, carries the revolutions counter 3 and the totalizer 4. 5 and 6 designate the two carriage shift keys, key 5 for moving the carriage to the right, according to the arrow provided thereon, and key 6 for moving it to the left. The clearing keys and the subtraction keys are omitted for clarity.

The addition key 7 is carried by the lever 8 which is pivotally mounted at 9 on the frame wall 10. A spring 11 connected to lever 8 and the frame tends to hold the lever in the position shown in Fig. 2. Attached to lever 8 is a pin 12 which contacts an edge 14 provided on a lever 13. The lever 13 is fixed to a shaft 15 extending transversely of the machine, and through the oscillating movement of which in a manner hereinafter described, the drive coupling and the circuit for the electric motor of the calculating machine are controlled.

Figure 2:
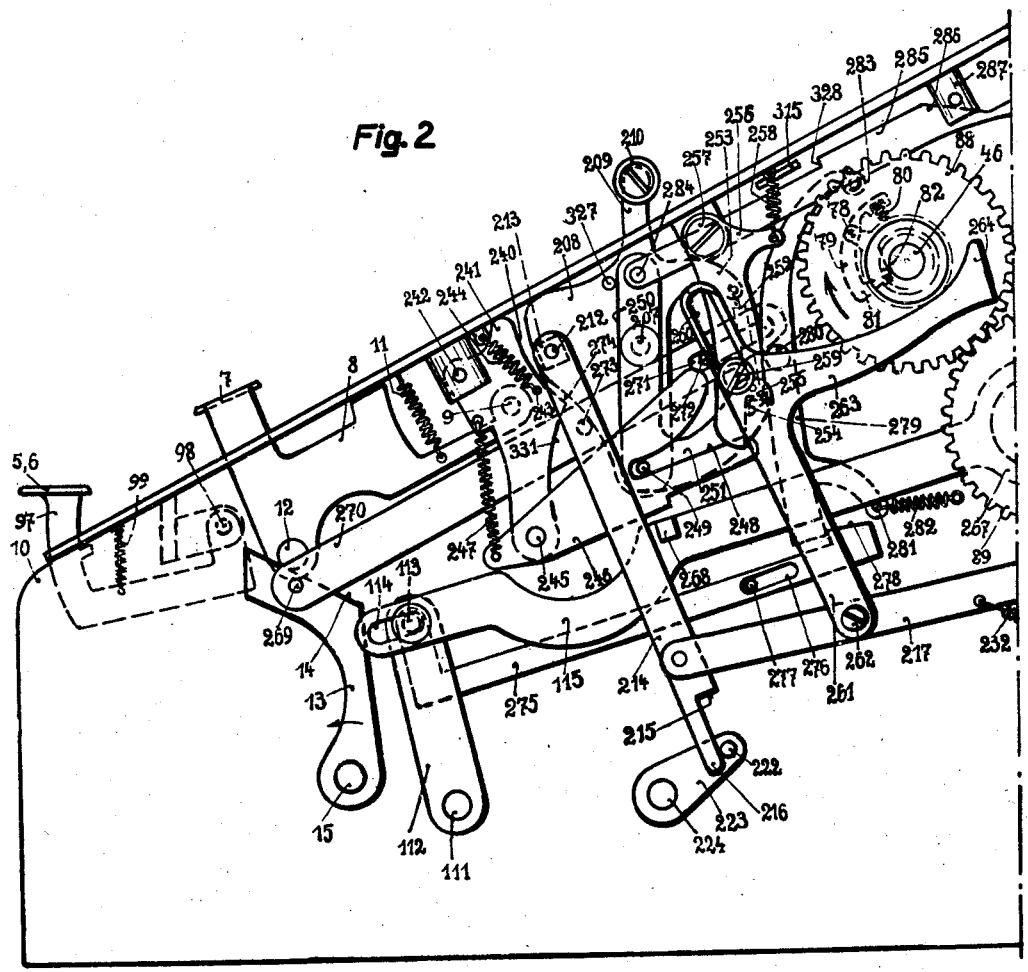
Fig. 2 is a partial lateral elevation as viewed from the right of Fig. 1 with the casing removed.

On depressing key 7, the lever 13 is swung to the left, from the position shown in Fig. 2, and the shaft 15 rotates in the direction of the arrow in Fig. 2. Also, on depressing the plus key 7 the setting bar 16 is moved to the left from the position shown in Fig. 12 into the position shown in Fig. 3 by means of a rod not shown on the drawings, provided such rod controlling bar 16 is not already in the position of Fig. 3 before the plus key 7 is depressed. Such a construction for operating the bar 16 is shown in Swiss Patent No. 189,683.

*Setting mechanism for positive or negative rotation of totalizer and revolutions counter*

The bar 16 through appropriate connections sets the controls for the gear housings 17 or 18, coordinated with the totalizer and the revolutions counter respectively, so that the appropriate bevel gears of the housings 17 and 18 will mesh with the bevel gears 19 or 20 of the totalizer and revolutions counter for addition or subtraction. The setting bar 16 has an elongated slot 21 in which is positioned a guide pin 22 provided in the frame wall 10 and the bar 16 is provided also with a member 23 having a pin 24 cooperating with the forked end 25 of a lever 26 which is fixed to shaft 27 journaled in the machine frame.

Also fixed to shaft 27 is another lever 28 which engages by means of a pin 29 in the longitudinal slot 30 of a plate 31. Coordinated with plate 31 is a plate 32 which is fixed to the shaft 33 journaled in the machine frame and is provided with two pins 34 and 34'. Shaft 33 is provided with pins 35 which extend into openings in the bar 36. This bar is transversely slidable on the machine frame and engages in corresponding annular grooves 37 of the bevel gear housings 17 which carry the bevel gears 38 and 39.

The housings 17 are axially slidable on the parallel shafts 40, which are rectangular in cross section. Mounted on these shafts 40 are the selecting gears 42 coordinated with the well known differential actuator cylinders 41, said gears 42 being likewise longitudinally slidable. These gears 42 are connected with the keys of keyboard 1 so that, for example, on depression of key "4" the coordinated gear 42 is moved so that it is within range of that portion of the corresponding actuator cylinder 41 provided with four teeth.

The actuator cylinders 41 are attached on the shafts 43 journaled parallel in the machine frame and are driven by the bevel gears 44 and 45 from the main calculating shaft 46.

A setting plate 48, which can be connected alternatively with the pins 49 and 50, also is pivotally connected to the setting bar 16 at 47. See Fig. 12. The pins 49 and 50 are provided at the ends of a lever 52 oscillatably journaled at 51 on the machine frame. Pivoted to one end of lever 52 is a link 53 which is pivotally connected at the other end with a link 54. The latter is journaled at 55 in the machine frame and is connected with a lever arm 56 (see Fig. 2a) which has a pin 57 extending into the longitudinal slot 58 of a setting plate 59.

Plate 31 and the plate 59 are provided with two shoulders 60 and 61 which can be carried alternately within range of pins 34 and 34' and 62 and 63, respectively. The pins 62 and 63 are on a plate 64 which in turn is fixed to the shaft 65 journaled in the machine frame. Shaft 65 is provided with pins 66 which extend into openings provided in a setting bar 67 as shown in Figs. 12 and 13.

Like bar 36, the bar 67 is transversely slidable on the machine frame and engages in the annular grooves 68 of the bevel gear housings 18. The bevel gears 69 and 70 are provided on the housings 18. The housings 18 are mounted longitudinally slidable on the shafts 71 having a rectangular cross section and are journaled in the machine frame coaxially with the shafts 40.

The plates 31 and 59, as shown in Fig. 3, are journaled at 72 on an oscillating plate 73, which in turn is pivoted on screw 74. Mounted on plate 73 is the roller 75 which cooperates with a cam disc 76, which has a recess 77 on its periphery.

This disc 76 is connected detachably by a coupling with the main calculating shaft 46. The coupling consists of a lever 79 journaled at 78 to the disc 76 and its free end is subjected to the action of a pressure spring 80, which tends to urge the pawl 81 of lever 79 inwardly within range of an entraining member, as the nose 82 provided on shaft 46 (see Fig. 2). Thus, if main shaft 46 is rotated in the direction of the arrow in Fig. 2, the cam disc 76 is carried along.

At the beginning of the rotation from the position of Fig. 3, plate 73 is swung out in the direction of the arrow shown in Fig. 3, and plates 31 and 59 are moved backwardly to the right. If the plates 31 and 59 are in the position shown in Fig. 3, the shoulders 60 contact with the pins 34 and 62, and the plates 32 and 64 are swung clockwise. The bevel gear housings 17 and 18 are therefore moved backwardly to the right in Fig. 3 and the result is that the gears 38 and 69 on these housings are coupled with the bevel gears 19 and 20 of the totalizer and the revolutions counter respectively.

These bevel gears 19 and 20 are journalled on pins 83 attached to the carriage 2 and connected, with the number wheels 84 and 85, respectively, which are coordinated with the window openings 86 and 87 of the totalizer and revolutions counter, respectively.

The driving mechanism

The main shaft 46, as shown in Figs. 2, 2a and 13, is driven through the spur gear 88 attached thereto which meshes with spur gear 89 of the same size. The latter is attached on the main drive shaft 90 journaled parallel to shaft 46. The shaft 90 also carries, freely rotatable, a spur gear 91, which can be coupled therewith by means of a clutch to be described hereinafter. (See Fig. 14.) Gear 91 engages with another spur gear 92 which is attached to the shaft 93 journaled in the machine frame. Connected with gear 92 is a pulley 94 over which the belt 96 driven by the electric motor 95 runs.

Control of shifting of carriage

The two carriage shift keys 5 and 6 are mounted on two adjacent levers 97 pivotally mounted on the pins 98 on the machine frame. Traction springs 99 engage with levers 97 and tend to retain the levers 97 in the position shown in Fig. 2. Also mounted freely rotatable on pin 98 is a plate 100 on which there is a pin 101 which extends into the path of movement of the lever 97 on which the key 5 is mounted. By means of a pressure spring 103 acting on an extension 102 of plate 100 the lever is urged to the position shown in Fig. 5.

On pressing the carriage shift key 5, the plate 100 is swung in the direction of the arrow in Fig. 12 so that the hook or latch extension 104 on plate 100 releases the square pin 105 on lever 106 as shown in Fig. 4. The lever 106, journaled at 107 on the frame wall 10, then can swing downwardly under the action of the powerful traction spring 108. Lever 106 engages with its lower surface a pin 109 which is on a lever 110. The latter is fixed to the shaft 111 journaled in the wall 10 and to this shaft the lever 112 is also fixed. Levers 110 and 112 are swung into the position shown in Fig. 3 by the traction of spring 108 and the pin 113 on the end of lever 112 moves in the longitudinal slot 114 of a crank rod 115. In this swinging movement of the pair of levers 110 and 112 the end of lever 112 strikes against lever 13 and swings it into the position shown in Fig. 3. This throws the machine into operation by rotating the shaft 15.

A lever 118 is journaled at 116 and a cooperating lever 118' is journaled at 117 on lever 106. These levers, through the action of the spring 119 engaged therewith, are applied against a pin 120 provided on lever 106. The ends of the levers 118 and 118' enclose the projecting shoulder 121 of a bar 122 between them. The bar 122, by means of the slot opening 123, engages over a pin 124 provided on lever 106. The other end of bar 122 is pivoted by a pin 125 to a sliding rod or bar 126 through the movement of which the movement of the carriage to the right is controlled.

Carriage shifting mechanism

The following means serve for shifting the carriage: Attached to the end of the shaft 43 positioned at the extreme right with respect to Fig. 12 and which extends almost to the rear wall of the machine, is a spur gear 127 which meshes with a spur gear 128 of the same size (see Fig. 9). This spur gear is fixed on a shaft 129 journaled in the machine frame and connected therewith is a clutch element 130. A spur gear 131, with which the other clutch element 132 is connected, is slidably mounted on shaft 129. Gear 131 is provided with an annular groove in which the end 133 of a plate 134 engages. The plate 134 is attached to the slidingly mounted bar 126. Gear 131 meshes with a spur gear 135 which in turn meshes with spur gear 136 which is journaled on a pivot pin 137 attached to the machine frame. Gear 136 is provided with two diametrically opposite pins 138 which cooperate with the shift slots 139 of a bar 140. Bar 140 is connected to carriage 2.

If lever 106 is swung by the traction of spring 108 into the position of Fig. 3, the bar 122 is carried to the left or forwardly to the position shown in Fig. 3 through the action of lever 118'. The two clutch elements 130 and 132 are brought together. On a simultaneous starting of the drive motor the gear 127 is rotated in the direction of the arrow in Fig. 9. This rotation of the gear 127 causes, through the gears 128, 131 and 135, a rotation of gear 136 in the direction of the arrow in Fig. 9. The result of the rotation of gear 136 is a movement of carriage 2 in the direction of the arrow in Fig. 9, which means a movement to the right with respect to Fig. 1.

A movement of the carriage to the left will take place through the gears 128', 131' and 135' which are controlled by a similar mechanism, not shown in the drawings, but which, however, is under the control of the carriage shift key 6.

Control of driving mechanism

The drive means are set in operation as follows. Fixed to shaft 15, at the other side of the machine (Fig. 8) is a lever 141 to which a powerful traction spring 142 is connected and which tends to swing the lever 141 into the position shown in full lines in Fig. 8. On the end of lever 141 is a pin 143 with which the hook-shaped recessed end 144 of a rod 145 engages. The other end of the rod 145 is connected by the pivot pin 146 with a bell-crank lever 147 which is pivoted by means of the pivot pin 148 to the frame wall 149.

Provided at the free end of lever 147 is a pin 150 which cooperates with the end of a double-armed lever 151. The latter is pivoted at 152 to a lever 153 which is mounted by means of the pivot pin 154 on the wall 149. A traction spring 155 engaging one end of the lever 151 tends to apply the other end of the lever 151 against the pin 150. Lever 151 is engaged from below by a pin 156 on a lever 157. The latter is pivotally mounted by the pivot pin 158 on the wall 149 and is subjected to the action of a traction spring 159 which tends to swing lever 157 upwardly.

Lever 157 is also provided with an abutment 160 which serves as a latch for a shoulder-like projection 161 on a lever 162 mounted on the shaft 163 journaled in wall 149. See also Fig. 14.

The levers 164 and 165 are also fixed to shaft 163. Engaging with lever 165 is a traction spring 166 which tends to rotate the levers 162, 164 and 165 clockwise. Attached to the end of lever 164 and insulated therefrom is the contact member 167 which, when the lever is rotated clockwise, as shown in Fig. 14, bridges the contact points formed by two contact springs 168 and 169 and which are connected in the circuit of the electric motor.

The stop-like end 170 of lever 165 extends into the path of movement of the clutch lever 171. The latter is mounted by means of the pivot pin 172 on a disc 173 fixed to shaft 90. A pressure spring 174 engaging the member 171 tends to press the friction surface 175 of member 171 into the groove 176, which is wedge-shaped if desired, provided in a connection 177 provided on the spur gear 91. The shaft 90 is always held in a predetermined position by the clutch. See also Fig. 13.

Attached to the shaft 90, as shown in Figs. 8 and 13, is a cam 178 which cooperates with a roller 179 journaled on lever 153. A traction spring 180 connected to lever 153 tends to hold roller 179 in contact with the cam 178. It is to be noted that the shoulder 161 also extends into the path of movement of the lever 151 which is provided with the hook-like shoulder 181.

Connected to rod 145, at 182, is a link 183 which is connected at the other end, by pivot pin 184, with the double-armed lever 185. The latter is journaled rotatably at 186 on the frame wall 149 and is subjected to the action of a traction spring 187 which gives lever 185 the tendency to force the recess in the hook-shaped end 144 over the pin 143 by means of the member 183. Provided at the free end of lever 185, is a slide 188 in the longitudinal slots 189 of which the guide pins 190 attached to lever 185 engage. A traction spring 191 is connected to slide 188 and tends to hold the slide 188 in the right end position, as seen in Fig. 8.

The clearing mechanism

Slide 188 is provided with an upwardly extending member 192 which extends into the plane of an inclined cam 194 provided on a double-armed lever 193. The latter is oscillatably journaled at 195 to the machine frame and its upper end 196 is connected with the slidingly mounted shaft 197. The shaft 197 is journaled by means of the bearing 198 in the machine frame, oscillatably and also axially slidable. Attached to the shaft 197, see Fig. 14, is a bar 199 which extends across all the key check slides 200. There is a check slide 200 provided for each bank of keys.

Each key stem 201 is provided with a lateral pin 202 which extends into a recess 203 provided on the key check slide 200 for each pin 202. For example, if a key, shown in Fig. 14, is depressed, the key check slide, after being forced to the right preliminarily against the traction of a spring, not shown, will, after the pin 202 on such key has cleared the recess 203 coordinated therewith, return to its original position and lock such key in depressed position.

If the shaft 197 is swung in the direction of the arrow in Fig. 14 then, through the bar 199, all the key check slides 200 are forced to the right and any keys retained in the depressed position are released. Shaft 197 can be so swung by actuating the clearing key.

The clearing oscillatory movement of shaft 197 can, however, be done mechanically at the end of each rotation of the calculating shaft 46, the shaft 197 being moved to the right by means of the handle 204 engaging the end of shaft 197 (see Fig. 1), so that the lug 205 provided on shaft 197 is carried within range of a cam 206 fixed on the main calculating shaft 46. Shortly before the termination of a complete revolution of the shaft 46 in the direction of the arrow in Fig. 14, this cam 206 strikes against the lug 205 and swings the shaft 197 in the direction of the arrow. In this manner all the check slides 200 are at once carried into the key releasing position, which clears the value set up on the keyboard.

Mechanism for shifting carriage predetermined number of places

Combined with the above arrangements is a mechanism by means of which, through a single instrumentality, the carriage is moved as many positions to the right as the quotient should have decimal places, the dividend set up in the keyboard is transferred to the totalizer, the turning in of the "1" in the revolutions counter is prevented and the keyboard cleared.

The above mechanism consists of a pivoted plate 208, pivoted to the frame wall 10, by means of the pivot pin 207 and the extension 209 thereof passes through the upper portion of the machine housing and has a handle 210 attached thereto. A traction spring 211 (see Fig. 7) connected to plate 208 tends to hold it in the position shown in Fig. 2. A bar 214 provided at its lower end with a lug 216 forming a shoulder 215, is pivoted to the plate 208 by means of the pin 212, the head 213 of which projects as an abutment.

Connected to bar 214 is a rod 217, the end of which is connected by a pivot pin 218 with a lever 219 (see Fig. 2a), which latter is fixed to the shaft 220 journaled in the machine frame. A spring 221 connected to the rod 217 and the lever 219 tends to swing these two parts toward each other and bring the lug 216 against a pin 222 on a lever arm 225. The latter is fixed to a shaft 224 journaled in the machine frame and the lever arm 225 is also mounted rigidly on said shaft. Attached to arm 225 is a pin 226 located in the elongated slot 227 located at one end of a bar 228. The other end of bar 228 is pivoted at 229 to the oscillating plate 100.

Pivoted to rod 217 at 231 is bell-crank lever 230 to one arm of which there is connected a traction spring 232 which tends to apply the other arm of lever 230 against an abutment pin 233 on rod 217. Bell crank lever 230 is provided with an edge 234 which extends into the path of a pin 235 which is on bell crank lever 237 journaled at 236 in the machine frame. The forked arm 238 of the bell crank lever 237 engages a pin 239 on the rod 16.

A plate 241, which is rotatably attached to the machine frame at 242, contacts with its edge 240 against the abutment-like head 213. Attached to plate 241, at 243, is a traction spring 244 which tends to swing plate 241 to the right to the position shown in Fig. 2.

At the lower end of plate 241 there is pivoted by means of the pin 245, a plate 246 having connected thereto a traction spring 247 which tends to swing plate 246 clockwise about the pin 245.

The plate 246 is provided with a recess 248 in which is positioned a pin 249. The latter is on double-armed lever 250 and the arc shaped end 251 of said lever has a traction spring 252 connected thereto which is connected at its other end to an extended arm 253 of the plate 208.

Through the traction of this spring 252 an abutment 254 on arc shaped end 251 of lever 250 is applied against a shoulder 255, which is provided on a plate 256. The plate 256 is pivoted at 257 to the machine frame and is subjected to the action of the spring 258. A pin 259 on plate 256 engages in the elongated slot 260 of a lever 261, which is oscillatably journaled at 262 to the rod 217. The lever 261 is provided with a lateral extension 263, whose end 264 extends into the path of a pin 265 on the side of spur gear 89.

There is provided on gear 89 an eccentric 266 with which the eye 267 provided on the crank rod 115 engages. On each revolution of the main drive shaft 90, the crank rod 115 makes a complete reciprocation. On rod 115 is an abutment 268 which extends laterally into the plane of plate 246.

Engaging with lever 13 (see Figs. 2 and 7) by means of pivot pin 269 is a bar 270 which has an elongated slot 271 provided at its end, into which a guide pin 272 provided on the frame extends. A pin 273, against which the left curved edge 274 of plate 208 is applied, is provided on bar 270.

Pivoted to the pin 113 of lever 112 is a bar 275 having a guide slot 276 in which extends a pin 277 on the frame. The end of bar 275 is provided with an edge surface 278 which cooperates with the lower end of a lever 279 oscillatably journaled at 280 to the machine frame. A traction spring 282 is connected to an extension of lever 279 at 281 and holds the lever 279 in the position shown in Fig. 2. A roller 283 is journaled at the free end of lever 279 and may be brought into contact with the coupling lever 79.

Connected to the upper end of the lever 250 by means of the pivot pin 284 is a bar 285 which has an inclined portion 286 engaging in a slotted guide pin 287 and is guided thereby. At the end of bar 285 there is connected the traction spring 288 whereby the surface 286 is applied against a cross pin 289 provided in pin 287. On bar 285 there is a pin 290 which extends into the elongated slot 291 provided in a rod 292. The other end of the rod 292 is pivotally connected to a pin 293 on a lever 294, which in turn is journaled at 295 in the machine frame.

The free forked end of lever 294 engages in the annular groove 297 provided on the housing 298. The latter is mounted longitudinally slidably but non-rotatably on the shaft 43 and carries the transmission tooth 299 for the revolution counter. Coordinated with this single tooth housing 298 is the counter gear 300 provided with ten teeth, which is attached at the extreme right (with respect to Fig. 1) on shaft 71. By moving the housing 298 from the position of Fig. 2a the rotation of shaft 43 with respect to the revolutions counter can be rendered inoperative.

There are also attached to shaft 220 the two lever arms 301 (Fig. 1) which carry at their ends a bar 302 the left end 303 of which (Fig. 1) is slightly bent down.

A bar 304 is attached by means of screws 305 to the carriage 2. This bar is provided with notches 306 spaced apart corresponding to the ordinal positions of the carriage. A slide 307 provided with a pin 308 extending into the path of bar 302 is mounted on bar 304. A wedge or key member 309 is slidably arranged in slide 307 and a pressure spring 310 is applied thereagainst. The key member 309 thereby cooperates with the recesses 306 like a spring snapping into the notches. The slide 307 is also provided with an observation opening 311 in which the number of decimal places to be set up appears.

It is also to be noted, as shown in Fig. 13, that the pin of the setting handle 204 engages through a slot 312 of a coordinated angle lever 313 which is oscillatably journaled at 314 in the machine frame. The free end 315 of lever 313 extends into the path of the bar 285. See also Fig. 2.

A plate 317 is pivoted at 316 on bar 122. By means of a traction spring 319 connected to plate 317 at 318, and at the other end, at 320, to bar 122, the plate 317 is applied by its surface 321 against the substantially vertical or perpendicular abutment plate 322 which is mounted on a bar 323 secured transversely in the machine frame. The plate 317 is also provided with an abutment 324 and an upwardly extending member 325, which latter extends in the path of movement of a cam member 326 attached to the main calculating shaft 46.

The operation

The operation of the elements will now be explained in connection with the following example: 88÷34. It is further assumed that this division is to be carried out to five decimal places.

For this purpose the slide 307 is first set on the bar 304 so that the "5" appears in the observation opening 311. The dividend "88" is then set up in the two extreme right banks of the keyboard. Then, by operating the handle 210, the plate 208 is carried from the initial position shown in Fig. 2 into that shown in Fig. 3. In the end position the shoulder 331 of the oscillating plate 241 comes in front of abutment 213, so that the plate 208, after release, is held in the position shown in Fig. 3. Through the oscillating movement of plate 208 the bar 214 is moved downwardly whereby the shoulder 215 contacts with the pin 222 and the two levers 223 and 225 are swung into the position shown in Fig. 3.

At the same time therewith the bar 217 is swung downwardly about the pin 218 and the result of this is that the edge 234 of lever 230 contacts the pin 235 and angle lever 237 is carried into the position shown in Fig. 3.

Through this swinging movement of the angle lever 237 the bar 16 is moved to the left into the position shown in Fig. 3. By means of the rod system 23, 26 and 28 the shoulder plate 31 has been swung into the position of Fig. 3 in which upon plate 31 being moved to the right, the bevel gear housings 37 are coupled for positive actuation with the bevel gears of the totalizer.

The plate 100 is swung in the direction of the arrow in Fig. 12 into the position shown in Fig. 3, by the swinging movement of levers 223 and 225, by the bar 228, so that the hook shoulder 104 releases the pin 105 and the lever 106 then passes into the position shown in Fig. 3 under the action of the strong spring 108.

The shaft 111 is then rotated by the action of lever 106 on the pin 109, so that levers 110 and 112 pass into the position shown in Fig. 3. In the swinging movement of levers 110 and 112, the bar 275 is carried into the position shown in Fig. 3, causing lever 279 to swing clockwise and press its roller 283 against the free end of the lever 79, to remove pawl 81 from nose 82. On the following rotation of shaft 46 the cam disc 76 is not carried along therewith.

Also in the swinging movement of levers 110 and 112 into the position shown in Fig. 3 the end of lever 112 strikes against lever 13 and swings it into the position shown in Fig. 3. The result is that the lever 141 is carried by means of shaft 15 into the position shown in dotted lines in Fig. 8. Then, through the rod 145, the bell crank lever 147 is swung in the direction of the arrow in Fig. 8 and the pin 150 rotates the lever 151 in clockwise direction and the latter, through pin 156, moves the lever 157 downwardly, so that the abutment 160 releases the projection 161 on lever 162. The levers 162, 164 and 165 under the action of the spring 166 swing in the direction of the arrow in Fig. 14, and the contact 167 closes the circuit of the electric motor and the shoulder 170 releases the clutch lever 171. The motor is thus set in operation and, as a result of the release of lever 171, the friction surface 175 is pressed by the spring 174 into the wedge groove 176, so that the main drive shaft 90 is set in rotation, which is connected by means of the gears 89 and 88 with the main calculating shaft 46.

Inasmuch as, in the swinging movement of lever 106, the rod 122 was carried to the left, the clutch elements 130 and 132 are in the engaged position shown in Fig. 3. In the rotation of main shaft 46, the gear 136 in rotated through shaft 43 and the cooperating gears, in the direction of the arrow in Fig. 9, and the carriage is moved to the right as viewed in Fig. 1.

In the rotation of shafts 90 and 46 the crank rod 115 is moved by the eccentric 266 to the right as viewed in Fig. 3 whereby, shortly before the crank rod 115 arrives at the half cycle position as shown in Fig. 4, the elongated slot 114, after having at first only moved on pin 113, carries levers 112 and 110 back to the initial position. Although lever 112 releases lever 13 when swung back to the position shown in Fig. 2, lever 13 cannot pass to its initial position under the action of the spring 142 connected to the lever 141 because it is checked by the rod 270, whose pin 273 is applied against the curved shoulder 274 of plate 208. The lever system 13, 15, 141—147 thus remains fixed with the motor circuit closed. When levers 112 and 110 are swung back the lever 106 is also swung back by the pin 109 into the initial position indicated by the full lines in Fig. 4.

In this movement of the lever 106, in order that the rod 122 will not be carried to the right as viewed in Fig. 4 into its initial position, the above mentioned plate 317 is provided, whose extension 325 is engaged at the beginning of the rotation of shaft 46, by the cam member 326, so that the shoulder 324 may come into position in front of the stationary abutment plate 322.

The return of the lever 106 to the initial position thus takes place with a corresponding swing of the lever 118 (see full line position in Fig. 4). On further rotation of shafts 46 and 90 the crank rod 115 is again moved to the left into the dotted line position in Fig. 4.

Since the plate 100 is still in the position shown in Fig. 4 toward the end of the first complete revolution of shafts 46 and 90, the lever 106 is again carried in this movement of crank rod 115 by the traction of spring 108 into the dotted line position shown in Fig. 4. When shaft 46 and/or 90 has described a complete revolution, the cam 326 has passed into the dotted line position shown in Fig. 4, in which it forces the plate 317 into the release position indicated by dotted lines.

Inasmuch, however, as the lever 106 has again assumed its lower position, the rod 122 remains in the position shown in Fig. 4 After the shafts 46 and 90 have described their first revolution they pass at once into the second, because disconnection has not yet taken place.

This operation, wherein the rod 122 is alternately held in the connected position of Fig. 4, first by the abutment devices 322 and 324 and then by the lever 118', is then repeated until the pin 308 contacts with the end 303 of the bar 302 and the lever arm 301 is swung in the direction of the arrow shown in Fig. 2a. This takes place when the slide 307 is set as at present on "5," during the fourth revolution, thus when the carriage describes its fourth shift to the right.

It is to be noted that at the end of each complete revolution of the main shaft 90, the cam 178 contacting with the roller 179 swings the lever 153 against the traction of the spring 180 to the left from the position shown in Fig. 8. However, since the lever 151 is still depressed by the pin 150 the shoulder 181 of lever 151 does not meet the projection 161 of lever 162, so that the clutch member 175 remains in the engaged position and the electric motor circuit closed.

Figure 5:
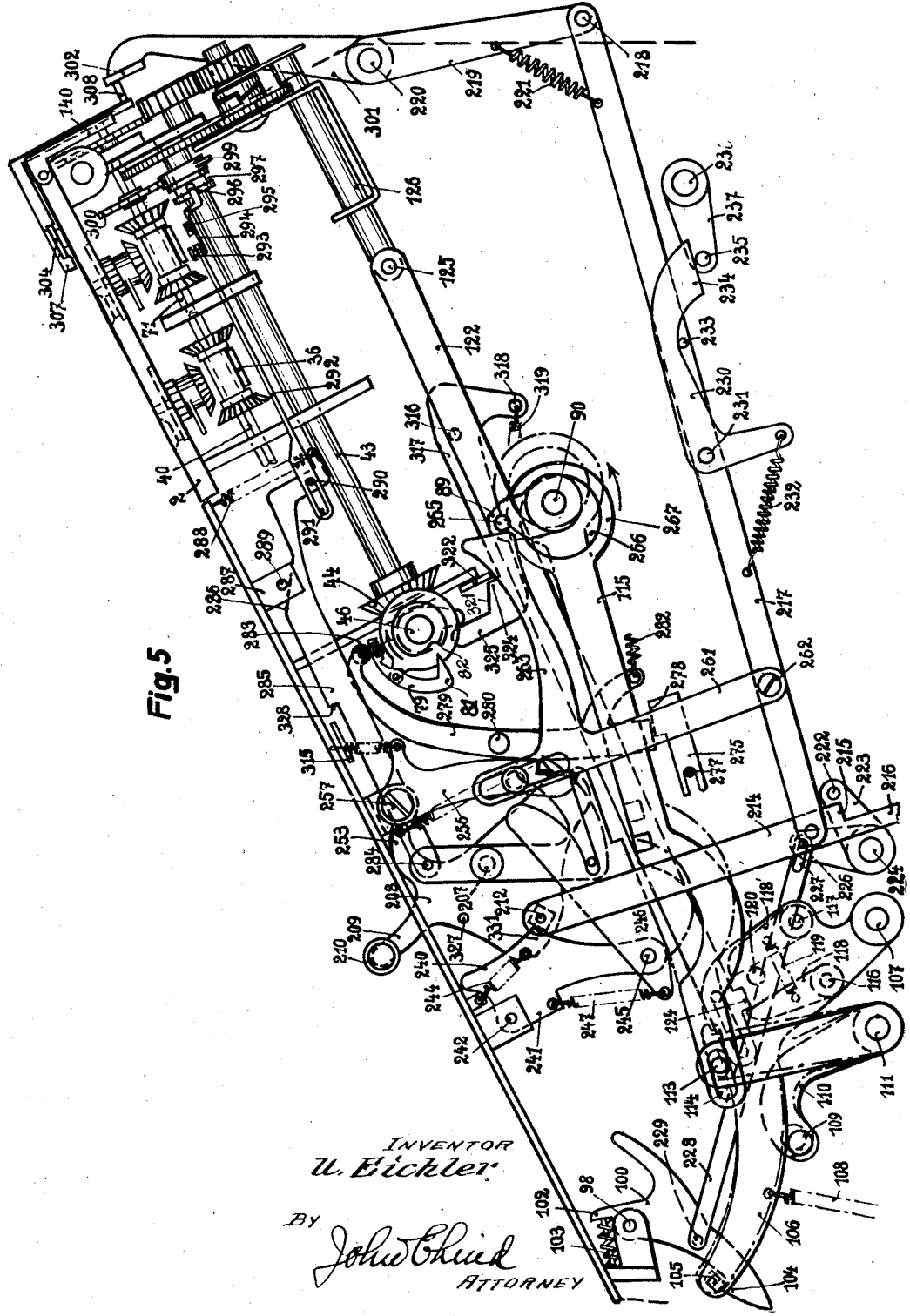
Fig. 5 is a side elevational view similar to Fig.

The rod 217 is moved in the direction of the arrow in Fig. 3 by the swinging movement of lever 301, acting through the lever arm 219 and the bar 214 passes into the position shown in Fig. 5. Shoulder 215 thereby releases pin 222 and the plate 100 can swing into the position shown in Fig. 5 through the action of spring 103. When the crank rod 115 passes beyond its half cycle position (see dotted line position in Fig. 5) the hooked end 104 can lock pin 105 so that, when the crank rod is finally again moved to the left, the lever 106 is held firmly against the traction of its spring 108 by the hooked end 104, in the position shown in Fig. 5 in full lines.

Fig. 5 shows the position of the elements of the mechanism shortly before the termination of the fourth revolution of shaft 46 and/or 90. At this moment the cam 326 contacts with the extension 325 of plate 317, whereby the latter is swung against the traction of spring 319 to release abutment 324 from the contact plate 322. The rod 122 will then move to the right under the action of the spring 119, which is under tension, into the initial position shown in Fig. 12, wherein the clutch parts 130 and 132 are disengaged.

It is further to be noted that through the previously mentioned movement of rod 217 to the left, the lever 261 connected thereto is swung about the pin 259 in such manner that the contact surface 264 passes within range of the pin 265 on spur gear 89 whereby, at the same time, while abutment 324 is released, through the contact of pin 265 on contact surface 264 the lever 261 is pivoted counter-clockwise so that the cooperating plate 256 is swung therewith and passes into the position shown in Fig. 6. The shoulder 255 is released from the abutment 254 and the lever 250 through the traction of spring 252 swings into the position shown in Fig. 6. In this position, the pin 249 on lever 250 releases the plate 246, so that it swings into contact with the laterally projecting shoulder 268 of crank rod 115.

In addition, the lever 250, on swinging into the position of Fig. 6, in which it is checked by a pin 237 on the oscillating plate 208, has moved the bar 285 into the position shown in Figs. 6 and 7. In this movement of the bar 285 to the left it describes a slight upwardly swinging movement, as a result of the inclined guide 286, so that its shoulder 328 strikes against the end 315 of the lever 313 and swings it clockwise from the position shown in Fig. 13. Through this swinging of the lever 313, the shaft 197 is moved so that the pin 205 moves into the range of the cam 206 mounted on shaft 46.

In addition, bar 285, in its movement to the left, has carried along the rod 292 so that the lever 294 rotates clockwise from the position shown in Fig. 13. In this swinging movement of the lever 294 the single tooth housing 298 is moved into the position shown in Fig. 7, in which the tooth 299 provided on the housing 298 is carried out of the range of the counter gear 300.

However, since at the beginning of the fifth revolution of the calculating shaft, the levers 110 and 112 remain in their initial position, the bar 275 is not moved, the result of which is that the roller 283 of lever 279 remains disengaged from the coupling lever 79. In this rotation of the main shaft 46, the disc 76 is therefore carried along and the plate 73 is swung in the direction of the arrow shown in Fig. 3. This causes the setting bars 36 and 67 to be moved backwardly to the right by means of the shoulder plates 31 and 59, bringing bevel gears 38 and 69 into engagement with the gears 19 and 20 of the totalizing and revolutions counter.

During the fifth revolution of the main shaft the value "88" set up in the keyboard is thus transferred into the totalizer 4, corresponding to the preliminary adjustment of the carriage 2 in the fifth and sixth decimal positions from the right as shown in Fig. 1.

Since the lug 299 is inoperative this rotation of the main calculating shaft 46 and/or the shaft 43 is not registered in the revolutions counter. The "1" is thus not turned thereinto. By the above mentioned adjustment of the clearing shaft 197, shortly before the end of the fifth revolution, the cam 206 of the main calculating shaft 46 strikes against the pin 205 of the shaft 197, whereby the latter describes the clearing movement in the direction of the arrow in Fig. 14.

In this movement of shaft 197 all the key check bars 200 are forced back simultaneously, so that the key stems 201 which may be held can spring back into their initial position. Through the previously mentioned movement of the clearing shaft 197 to the right with respect to Fig. 13, the lever 193 is swung about its pivot 195, so that its inclined surface 194 is carried within range of the slide extension 192 so that the slide 188 is moved against the traction of the spring 191 to the left as shown in Fig. 8 and its front end passes within range of the cam 178.

About the middle of the fifth revolution of the main drive shaft 90, the cam 178 strikes against the apex 329 of plate 188 and swings the lever 185 about pivot 186 against the action of the spring 187 in counter-clockwise direction. The bar 145 is raised slightly through this movement of lever 185, by means of the intermediate member 183, so that its recess is released from the pin 143.

As soon as the rod 145 is thus released from lever 141, the lever 151, depressed by lever 147, may again swing counter-clockwise through the action of spring 155, so that its shoulder 181 engages pin 161. If, at the end of the revolution of the main shaft, the cam 178 then swings the lever 153 to the left from the position shown in Fig. 8, the shoulder 181 engaging pin 161 swings the levers 164, 162 and 165 to the left, and the contacts 168 and 169 are broken and the check-like end 170 is carried within range of the clutch member 171 and the main shaft 90 is held firmly in the accurately predetermined end position.

When the lever 153 swings back into the initial position shown in Fig. 8, the shoulder 181 releases the pin 161 which, in turn, is held by the bolt-like member 180, which holds the three levers 164, 162 and 165 firmly in the end position shown in Fig. 8.

Shortly before the end of the fifth revolution of the main shaft the projection 268 of crank rod 115 strikes against the abutment 246' of plate 246 (see Fig. 7), whereby the plate 246 is swung by lever 115 and plate 241 is also pivoted. In this movement, the shoulder 331 of plate 241 releases pin 213, so that the oscillating plate 208 can swing into the initial position of Fig. 2 under the action of the spring 211 engaged therewith.

Thereby the shoulder 274 on plate 208 also releases the pin 273 of rod 270, so that the shaft 15 with its lever 13 and 141 can return to the initial position through the traction of spring 142, in which the recess 144 of rod 145 engages over the pin 143. In this swinging movement of plate 208, the lever 250 is forced back into the initial position of Fig. 2 by means of the pin 327, in which position its shoulder 254 comes in front of the shoulder 255 of the plate 256. In the return swinging movement of lever 250 the rods 285 and 292 are also again carried back into the initial position of Figs. 2 and 2a and the lever end 315 is released and the tooth 299 of housing 298 is carried within range of counter gear 300.

The machine is thus brought to a stop after the carriage has described the corresponding four advance movements to the right, after the value set up in the keyboard has been transferred into the totalizer and after the keyboard has been cleared. Inasmuch, as a "1" has been prevented from passing into the revolutions counter on the transfer of the value to the totalizer, the setting up of the divisor "34" in the keyboard can at once be made. According to the example used here, the "34" can be set up in the two extreme right key banks. The usual division operation is then performed by means not shown and the calculation operation selected as an example is terminated.

It is to be noted that the new arrangement presents, among others, the advantage that, without any special adjustment of the slide 307 and pin 308 provided on the carriage 2, if a series of division calculations having an equal number of decimal places in the quotients are being run, other division calculations may be carried out during the running of the series in which the quotients have a larger number of decimal places.

It is thus possible, notwithstanding that the slide 307 assumes, for example, the position shown in Fig. 1, to make a division calculation whose quotient should have, for example, eight decimal positions. In such case, by actuating the key 5, the carriage is permitted to describe seven advance movements to the right from the base position. Accordingly, by actuating handle 210, the dividend set up in the keyboard is at once carried into the totalizer 4, whereupon the corresponding divisor is set up and the machine set in operation in the usual manner.

It is also to be noted that the carriage shift keys are particularly easily actuated. While, heretofore, the resistance of the winding spring had to be overcome on depressing the carriage shift keys 5, in the present apparatus, on depressing the keys 5 or 6, only the latch plate 100 is pivoted, which releases the lever 106 to the action of the powerful spring 108. The tensioning of the spring 108 and the return of the lever 106 to the initial position takes place due to the action on the crank rod 115 by a cam eccentric 266 mounted on the drive shaft of the machine. It is apparent that the springs 99 for the key levers 97 and the pressure spring engaged with the latch plate 100 may be very weak, so that they offer no appreciable resistance to depression.

If, when the carriage shift is actuated by a key 5 or 6, the levers 118 and 112 are again drawn back by the crank rod 115 into the initial position, the end of lever 112 at the same time releases lever 13, so that it can return to the initial position together with the lever 141. The rod 145 is therefore again moved back to the initial position, and the pin 150 is moved into the position shown in Fig. 8. In this position the pin 150 releases lever 151 so that when lever 153 describes its swinging movement at the end of the revolution of the main shaft, the levers 164, 162 and 165 are moved into the inoperative position.

It is also to be noted that, no matter in what direction the machine has previously operated, the value is transferred from the keyboard into the totalizer 4 additively, by actuating the plate 208 which acts through the rod system 236—239.

In the embodiment shown, on transferring the value set up in the keyboard into the totalizer 4, the tooth 289 for the revolutions counter 3 is carried positively into the disconnected position, so that the appearance of the "1" in the revolutions counter is absolutely avoided. For example, in certain calculations for percentage the appearance of the "1" in the revolutions counter is desired in the transfer of the value set up in the keyboard into the totalizer.

In order to make it possible for the operator to avoid said "1" or to make it appear, an arrangement is provided as shown in Figs. 10 and 11. As shown on Fig. 10, the elongated slot 291 of the rod 292 is replaced by a hook-like member 330 which is attached to the end of rod 292. Opposite the open end of hook 330 is a shoulder or projection 331 which is preferably integral with the rod 292. Engaged with the hook 330 by means of the pin 332 is a rod 333 which is guided in a corresponding slot of the machine housing plate 334. Rod 333 is provided with a head 335. When rod 333 or head 335 is in the position shown in Fig. 10 the pin 290 on the bar 285 then lies in the range of the hook opening. In this case, if the bar 285 is moved in the direction of the arrow in Fig. 10, after a certain amount of play the rod 292 is moved to the left, so that the single tooth housing 298 is moved into the position shown in Fig. 7.

If, on the contrary, rod 333 is depressed against the action of its spring 337 (see Fig. 11) the pin 290 is outside the range of the hook-like member 330. Rod 333 is provided with a recess 336 by means of which it can be retained in the depressed position on plate 334 by a counter-clockwise movement as shown in Fig. 11. If, after this adjustment, the bar 285 is drawn to the left, the pin 290 will pass freely over the end of the rod 292, without carrying it along, so that the single tooth housing 298 remains in its operative position. This, however, means that during the clearing movement of the bar 285 the single tooth 299 remains in the operative position, so that on the transfer of the value set up in the keyboard into the totalizer the "1" is transferred into the revolutions counter. On a clockwise movement of the head 335 the rod 333 is swung into the released position, so that it may again pass into the position shown in Fig. 10 through the action of the spring 337.

The above constitutes a preferred embodiment of the invention, which is capable of various modifications and it is understood that all modifications as come within the spirit of the following claims are included within the scope of the invention.

I claim:

1. In a calculating machine comprising a carriage, a multi-order totalizer on said carriage, actuating means for entering values into said totalizer, and a shift mechanism for shifting said carriage relative to said actuating means, the combination of a stop on said carriage settable to any of a series of ordinal positions, a control lever, means under joint control of said lever and said stop for effecting operation of said shift mechanism to shift said carriage to the position corresponding to the position in which said stop has been set and for then effecting a single cycle of operation of said totalizer actuating means, whereby the value entered into the totalizer is entered into orders thereof determined by the setting of said stop.

2. In a calculating machine comprising a carriage, a multi-order totalizer on said carriage, actuating means for entering values into said totalizer, a shift mechanism for shifting said carriage relative to said actuating means, a revolutions counter and actuating means for said counter, the combination of a stop on said carriage settable to any of a series of ordinal positions, a control lever, means under joint control of said lever and said stop for effecting operation of said shift mechanism to shift said carriage to the position corresponding to the position in which said stop has been set and for then effecting a single cycle of operation of said totalizer actuating means, means controlled by said lever for rendering said counter actuator ineffective during this sequence of operations and manually settable means for rendering said last named means ineffective, whereby the value entered into the totalizer is entered into orders thereof determined by the setting of said stop and the counter actuator may be selectively operated.

3. In a calculating machine comprising a carriage, a multi-order totalizer on said carriage, actuating means for entering values into said totalizer and a shift mechanism for shifting said carriage to a plurality of positions relative to said actuating means, the combination of a stop on said carriage settable to any of a series of ordinal positions, a control lever, means under joint control of said lever and said stop for effecting operation of said shift mechanism to shift said carriage to the position corresponding to the position in which said stop has been set and for then effecting a single cycle of operation of said totalizer actuating means, said shift mechanism also being operable to shift said carriage to any of its positions while the setting of said stop is maintained for subsequent calculations.

4. In a calculating machine comprising a carriage, a multi-order totalizer on said carriage, actuating means for entering values into said totalizer and a shift mechanism for shifting said carriage relative to said actuating means, the combination of a stop on said carriage settable to any of a series of ordinal positions, a control lever, means under joint control of said lever and said stop for effecting operation of said shift machanism to shift said carriage to the position corresponding to the position in which said stop has been set and for then effecting a single cycle of operation of said totalizer actuating means, said means for effecting operation of said shift mechanism including a bar extending parallel to said carriage cooperating with said stop to terminate a carriage shifting operation so that said carriage may be brought to a stop at a determined position relative to said actuating means, whereby the value entered into the totalizer is entered into orders thereof determined by the setting of said stop.

ULRICH EICHLER.